(12) United States Patent
Walley

(10) Patent No.: US 8,369,252 B2
(45) Date of Patent: Feb. 5, 2013

(54) METHOD AND SYSTEM FOR TIME DIVISION DUPLEX HUM NOISE CANCELLATION

(75) Inventor: John Walley, Ladera Ranch, CA (US)

(73) Assignee: Broadcom Corporation, Irvine, CA (US)

(*) Notice: Subject to any disclaimer, the term of this patent is extended or adjusted under 35 U.S.C. 154(b) by 1058 days.

(21) Appl. No.: 12/137,256

(22) Filed: Jun. 11, 2008

(65) Prior Publication Data
US 2009/0310523 A1 Dec. 17, 2009

(51) Int. Cl.
*H04L 5/14* (2006.01)

(52) U.S. Cl. ........ 370/294; 370/280; 370/317; 375/346; 455/63.1; 381/94.1; 381/71.1

(58) Field of Classification Search ............ 381/13, 381/14, 94, 94.1, 83, 93, 71.1; 370/386, 370/406, 508, 337, 294, 280, 347, 442, 317; 379/416, 417; 455/63.1, 127.1, 268, 296, 455/464; 375/346, 341, 144, 224, 232
See application file for complete search history.

(56) References Cited

U.S. PATENT DOCUMENTS

| | | | | |
|---|---|---|---|---|
| 4,885,763 A * | 12/1989 | O'Brien et al. | ............ | 379/88.24 |
| 5,557,653 A * | 9/1996 | Paterson et al. | ............ | 455/575.2 |
| 5,812,936 A * | 9/1998 | DeMont | ........................ | 455/63.1 |
| 5,995,567 A * | 11/1999 | Cioffi et al. | ................... | 375/346 |
| 6,269,093 B1 * | 7/2001 | Alapuranen et al. | .......... | 370/343 |
| 2007/0153927 A1 * | 7/2007 | Ma et al. | ........................ | 375/260 |
| 2009/0225999 A1 * | 9/2009 | Lee | ................................. | 381/74 |
| 2010/0091688 A1 * | 4/2010 | Staszewski et al. | ........... | 370/277 |

OTHER PUBLICATIONS

Kubota, "Improved ADPCM Voice Signal Transmission Employing Click-Noise Detection Scheme for TDMA-TDD Personal Communication Systems", Feb. 1997, IEEE Transactions of Vehicular Technology, vol. 46, No. 1, pp. 108-113.*

* cited by examiner

*Primary Examiner* — Vivian Chin
*Assistant Examiner* — Friedrich W Fahnert
(74) *Attorney, Agent, or Firm* — Thomas|Horstemeyer, LLP

(57) ABSTRACT

Methods and systems for TDD hum noise cancellation are disclosed and may include correlating a received audio signal to a time division duplexed (TDD) envelope signal, controlling a feedback signal based on the correlating, and cancelling a TDD noise signal via the feedback signal. The amplitude and delay of the feedback signal may be configured for controlling. A least mean square (LMS) filter may be utilized for the correlating and may include a finite impulse response filter. The TDD envelope signal may be generated on the chip or may be received from a source external to the chip. The feedback signal may be added to the received audio signal for the cancelling.

24 Claims, 4 Drawing Sheets

METHOD AND SYSTEM FOR TIME DIVISION DUPLEX HUM NOISE CANCELLATION

CROSS-REFERENCE TO RELATED APPLICATIONS/INCORPORATION BY REFERENCE

Not Applicable

FEDERALLY SPONSORED RESEARCH OR DEVELOPMENT

Not Applicable

MICROFICHE/COPYRIGHT REFERENCE

Not Applicable

FIELD OF THE INVENTION

Certain embodiments of the invention relate to audio circuits. More specifically, certain embodiments of the invention relate to a method and system for time division duplex hum noise cancellation.

BACKGROUND OF THE INVENTION

In audio applications, systems that provide audio interface and processing capabilities may be required to support duplex operations, which may comprise the ability to collect audio information through a sensor, microphone, or other type of input device while at the same time being able to drive a speaker, earpiece of other type of output device with processed audio signal. In order to carry out these operations, these systems may utilize audio coding and decoding (codec) devices that provide appropriate gain, filtering, and/or analog-to-digital conversion in the uplink direction to circuitry and/or software that provides audio processing and may also provide appropriate gain, filtering, and/or digital-to-analog conversion in the downlink direction to the output devices.

As audio applications expand, such as new voice and/or audio compression techniques and formats, for example, and as they become embedded into wireless systems, such as mobile phones, for example, novel codec devices may be needed that may provide appropriate processing capabilities to handle the wide range of audio signals and audio signal sources. In this regard, added functionalities and/or capabilities may also be needed to provide users with the flexibilities that new communication and multimedia technologies provide. Moreover, these added functionalities and/or capabilities may need to be implemented in an efficient and flexible manner given the complexity in operational requirements, communication technologies, and the wide range of audio signal sources that may be supported by mobile phones.

The audio inputs to mobile phones may come from a variety of sources, at a number of different sampling rates, and audio quality. Polyphonic ringers, voice, and high quality audio, such as music, are sources that are typically processed in a mobile phone system. The different quality of the audio source places different requirements on the processing circuitry in such mobile phone systems.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for time division duplex hum noise cancellation, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for time division duplex (TDD) hum noise cancellation. Exemplary aspects of the invention may comprise correlating a received audio signal to a TDD envelope signal, controlling a feedback signal based on the correlating, and cancelling a TDD noise signal via the feedback signal. The amplitude and delay of the feedback signal may be configured or adjusted to enable the controlling. A least mean square (LMS) filter, such as a finite impulse response filter, may be utilized for the correlating of the received audio signal to a TDD envelope signal. The TDD envelope signal may be generated on a chip or may be received from a source external to the chip. The feedback signal may be added to the received audio signal to enable the cancellation of the TDD hum noise.

Figure 1:
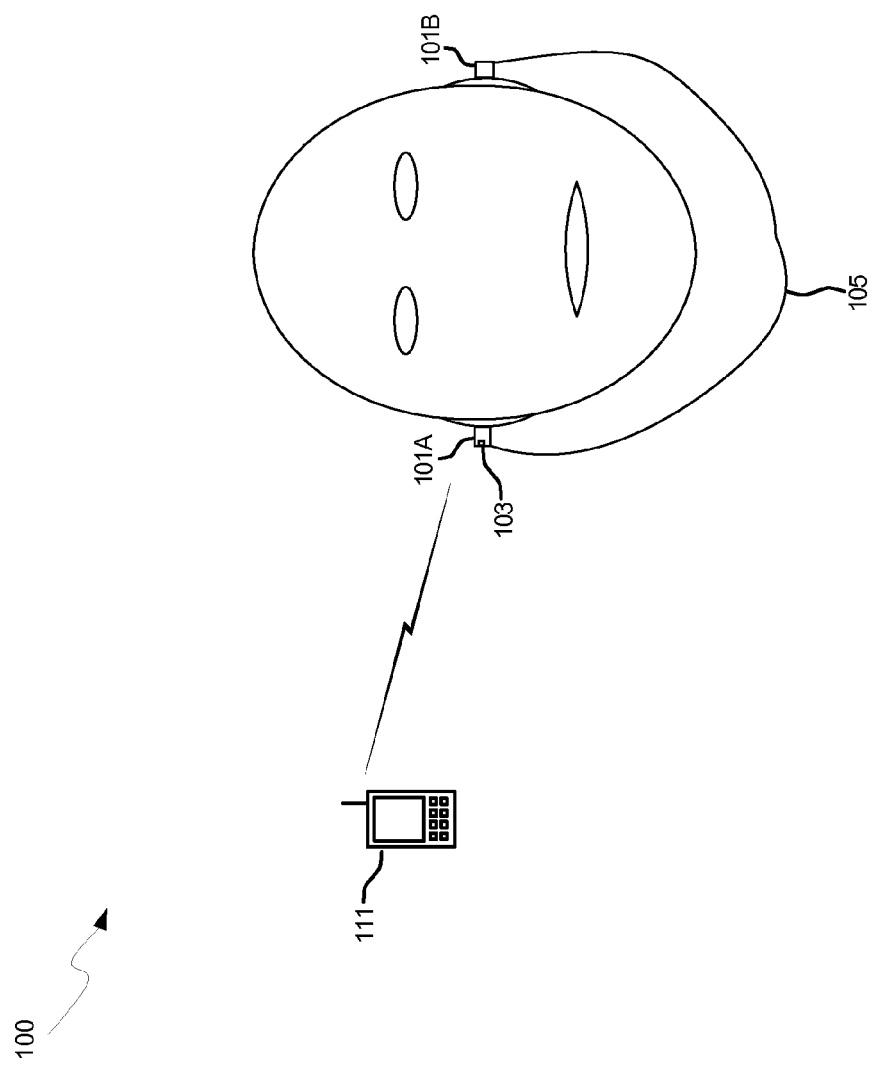
FIG. 1 is a block diagram of an exemplary wireless headset, in accordance with an embodiment of the invention.

FIG. 1 is a block diagram of an exemplary wireless headset, in accordance with an embodiment of the invention. Referring to FIG. 1, there is shown a wireless headset 100 comprising ear buds, or ear pieces 101A and 101B and a tether wire 105. The tether wire 105 may provide an electrical connection between the two ear pieces 101A and 101B for audio and/or control signals and/or supply voltage. There is also shown a charging port 103, and a wireless device 111.

The ear pieces 101A and 101B may comprise one or more circuits for communicating wirelessly with wireless devices such as the wireless device 111 and generating and receiving audio signals via speakers and microphones, respectively.

The wireless device 111 may comprise suitable circuitry, logic and/or code that may enable wireless communication between the user of the headset 100 and other wireless devices and users. The wireless device may comprise a cellular phone, or a handheld wireless communication and/or entertainment device, for example.

In operation, the wireless headset 100 may be enabled to transmit and receive wireless signals to and from the wireless device 111, and to generate and receive audio signals respectively, via speakers and microphones, respectively. In time division duplex (TDD) applications, such as with Bluetooth wireless headsets, in instances where the wireless headset 100 may be transmitting wirelessly, the RF carrier signal generated locally or from another source may be of sufficient power to be down-converted to audio frequencies due to non-linearities in the audio circuitry of the headset 100. This may be described as TDD hum noise, and may be a more significant problem as wireless headsets become smaller and shielding the audio circuitry becomes more difficult.

In an embodiment of the invention, the wireless headset 100 may be enabled to filter out the TDD hum noise. This may be accomplished by shorting the noise signal to ground using capacitors, as described with respect to FIG. 2, or by utilizing a digital signal processing (DSP) algorithm, as described with respect to FIG. 3.

The invention is not limited to wireless systems as described with respect to FIG. 1. Accordingly, any circuitry that may generate TDD hum noise from a wireless signal of enough strength to be down-converted to audio frequencies due to non-linearities in audio circuitry may utilize the invention. Examples may comprise recording devices and speaker phones.

Figure 2:
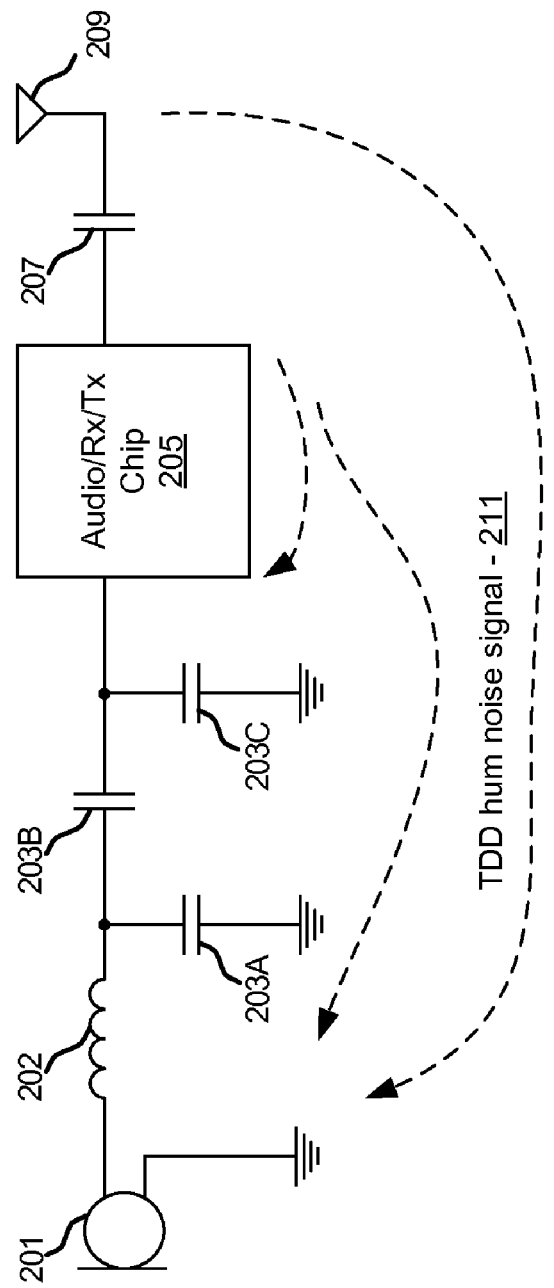
FIG. 2 is a block diagram illustrating an exemplary system for time division duplex hum noise cancellation, in accordance with an embodiment of the invention.

FIG. 2 is a block diagram illustrating an exemplary system for time division duplex hum noise cancellation, in accordance with an embodiment of the invention. Referring to FIG. 2, there is shown a microphone 201, an inductor 202, capacitors 203A, 203B, 203C and 207, audio/Rx/Tx chip 205 and an antenna 209. There is also shown a TDD hum noise signal 211, which may be generated by an RF carrier signal from Tx signals generated by the audio/Rx/Tx chip 205 being applied to non-linearities in the microphone 201 or the audio circuits in the audio/Rx/Tx chip 205. In another embodiment of the invention, the RF carrier signal may be received by the antenna 209 from an external RF source when the audio/Rx/Tx chip 205 may be receiving signals. The TDD hum noise signal 211 may correspond to the amplitude modulated carrier signal of an RF transceiver signal, for example.

The microphone 201 may comprise suitable circuitry, logic and/or code for converting received audio signals into electrical signals that may be transmitted by the audio/Rx/Tx chip 205. The inductor 202 and the capacitors 203A, 203B and 203C may enable shorting the TDD hum noise signal 211 to ground by the selection of appropriate capacitance values. The capacitor 207 may enable AC coupling of signals from the audio/Rx/Tx circuitry 205 and the antenna 209.

The audio/Rx/Tx chip 205 may comprise suitable circuitry, logic and/or code that may enable receiving and transmitting wireless signals via the antenna 209 and receiving and processing audio signals from the microphone 201. The audio circuitry in the audio/Rx/Tx chip 205 may comprise audio amplifiers and/or filters, and the Rx/Tx circuitry may comprise low noise amplifiers, mixers and power amplifiers, for example.

In operation, the microphone 201 may receive audio signals and convert them to electrical signals which may be communicated to the audio/Rx/Tx chip 205 via the capacitors 203A, 203B and 203C. In instances where the audio signal received by the microphone 201 is to be transmitted wirelessly, the audio/Rx/Tx chip 205 may communicate the resulting electrical signal to the antenna 209 via the capacitor 207 for transmission.

The carrier signal of the transmitted signal, or the carrier signal from an RF signal received by the antenna 209, may generate TDD hum noise when the RF carrier signal encounters a non-linearity, such as in the microphone 201, or audio circuitry in the audio/Rx/Tx chip 205. The capacitance values of the capacitors 203A, 203B and 203C and the inductance value of the inductor 202 may be selected to reduce or eliminate this generated TDD hum noise. However, utilizing capacitors to filter out TDD hum noise may require external capacitors, which adds to the part count and space requirements of the device. Thus, an integrated solution may be utilized, such as with DSP techniques for TDD hum noise cancellation, as described with respect to FIG. 3.

In instances where the TDD hum noise signal 211 is received in circuitry outside the audio/Rx/Tx chip 205, such as by the wiring for the microphone 201, for example, the inductor 202 and the capacitors 203A, 203B and 203C may be utilized to eliminate the hum noise. However, in instances where the TDD hum noise signal is coupled into the circuit after the inductor 202 and the capacitors 203A, 203B and 203C, the hum noise may be eliminated within the audio/Rx/Tx chip 205. In this manner, a wireless system antenna may be placed near wiring, which may not be possible if only external capacitors and inductors are utilized to eliminate TDD hum noise.

Figure 3:
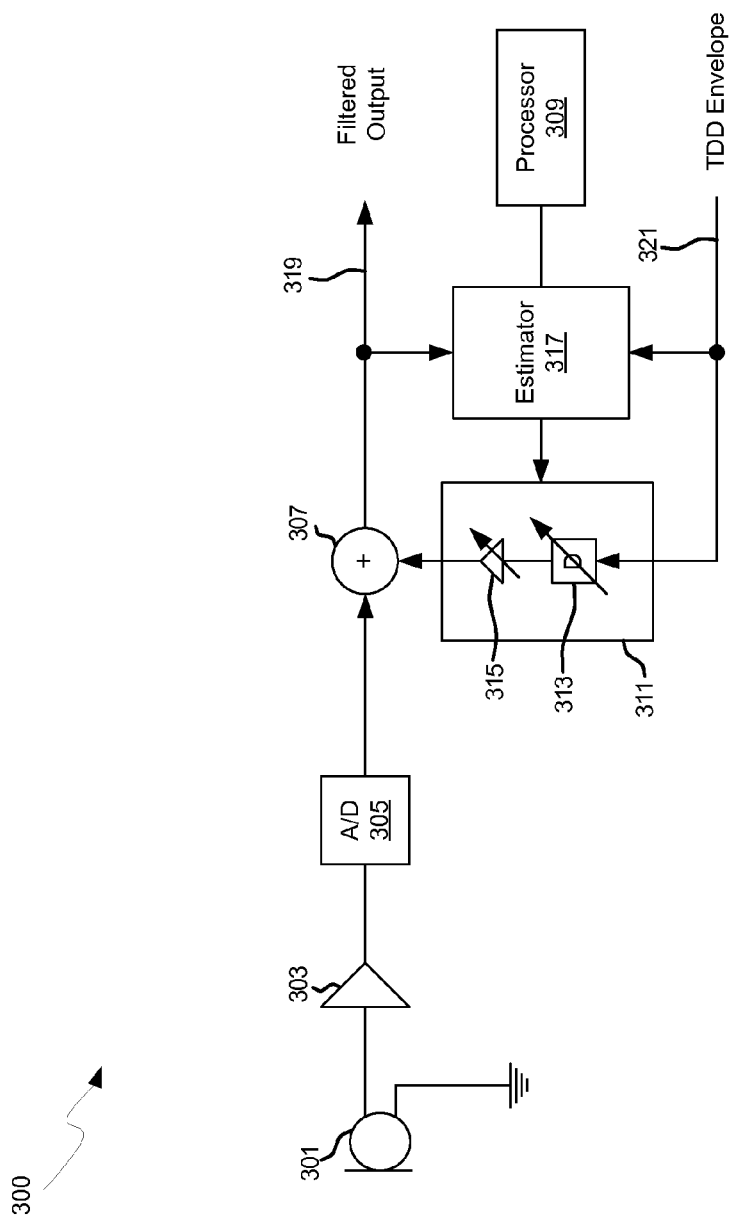
FIG. 3 is a block diagram of exemplary circuitry that enables DSP hum noise cancellation, in accordance with an embodiment of the invention.

FIG. 3 is a block diagram of exemplary circuitry that enables DSP hum noise cancellation, in accordance with an embodiment of the invention. Referring to FIG. 3, there is shown a TDD hum noise cancellation implementation 300 comprising a microphone 301, an amplifier 303, an analog to digital converter (A/D) 305, an adder 307, a processor 309, an estimator 317, and an amplitude/delay block 311 comprising a delay block 313 and an amplitude block 315. There is also shown a filtered output 319 and a TDD envelope 321.

The microphone 301 may be substantially similar to the microphone 201 described with respect to FIG. 2. The amplifier 303 may comprise suitable circuitry, logic and/or code that may enable amplifying an input signal generated by the microphone 301. The output of the amplifier 303 may be communicatively coupled to the A/D 305.

The A/D 305 may comprise suitable circuitry, logic and/or code that may enable converting an analog input signal to a digital output signal. The A/D 305 may receive as an input, the analog signal generated by the amplifier 303 and generate a digital output signal that may be filtered digitally using DSP techniques. In this manner, TDD hum noise may be cancelled from the audio signal.

The adder 307 may comprise suitable circuitry, logic and/or code that may enable generating an output signal that may be the sum of the signals applied to the inputs. The adder 307 may receive as inputs the signals generated by the A/D 305 and the amplitude/delay block 311 and may generate an output signal that may comprise the filtered output 319, which may also be communicated to the estimator 317 to act as a feedback signal to tune the filtering of TDD hum noise.

The processor 309 may comprise suitable circuitry, logic and/or code that may enable controlling the operation of the TDD hum noise cancellation implementation 300. The processor 309 may be enabled to configure the estimator 317 for adaptive filtering of an input signal communicated from the adder 307.

The amplitude block 315 may comprise suitable circuitry, logic and/or code that may enable programmably setting the amplitude of the output signal to be generated by the amplitude/delay block 311, respectively. The amplitude of the output signals may correspond to the amplitude of a TDD hum noise signal, such as the TDD hum noise signal 211 described with respect to FIG. 2, and may be utilized to minimize and/or eliminate the TDD hum noise.

The delay block 313 may comprise suitable circuitry, logic and/or code that may enable delaying a received signal. The delay of the delay block 313 may be tuned to correspond to the time delay of TDD hum noise to reduce and/or eliminate the TDD hum noise.

The estimator 317 may comprise suitable circuitry, logic and/or code that may enable adaptive filtering of an input signal to produce an error signal, which may correspond to the TDD hum noise. The estimator 317 may utilize a least mean square (LMS) technique to determine a correlation between the received signal, the filtered output 319 in this case, to the TDD envelope 321. A high correlation may indicate that the estimator 317 has correctly tuned to the TDD hum noise signal as indicated by the TDD envelope 321. The estimator 317 may comprise a single-tap finite impulse response (FIR) filter, for example, that may be tuned via its filter coefficients.

The TDD envelope 321 may comprise a signal that corresponds to the power level and duty cycle of a transmitted signal that may generate TDD hum noise. The signal generating TDD hum noise may be a local noise source, such as from the audio/Tx/Rx chip 205, or may be from an external transmitter generating an RF carrier signal, such as from the amplitude modulation from a GSM signal picked up by a speaker wire, for example.

In operation an audio signal may be received by the microphone 301 and communicated to the amplifier 303. In instances where there may be an RF carrier signal generating TDD hum noise via non-linearities in the amplifier 303, for example, the TDD envelope 321 may enable the amplitude/delay block 311 and the estimator 317 to generate a feedback signal to cancel the TDD hum noise. The estimator 317 may be enabled by the TDD envelope 321 to correlate the filtered output 319 to the TDD envelope 321 and to configure the delay and amplitude signal generated by the amplitude/delay block 311 based on this correlation. In instances when the signals are highly correlated, TDD hum noise may be cancelled when the output signal of the amplitude/delay block 311 may be fed back and summed with the A/D 305 output signal at the adder 307.

In another embodiment of the invention, the TDD envelope 321 may be created locally, such as within the audio/Rx/Tx chip 205 and/or the processor 309, if a signal may be detected where the characteristics of the signal may be known sufficiently to estimate the timing and duty cycle to reduce or eliminate the hum noise. For example, if a GSM signal, which may be known to have a 4.615 msec period, may be present but not generated from within the wireless system, the TDD envelope 321 may be created locally with a 4.615 msec period. In this manner, the TDD envelope may be explicitly given or may be predicted and/or calculated by the processor 309, for example.

Figure 4:
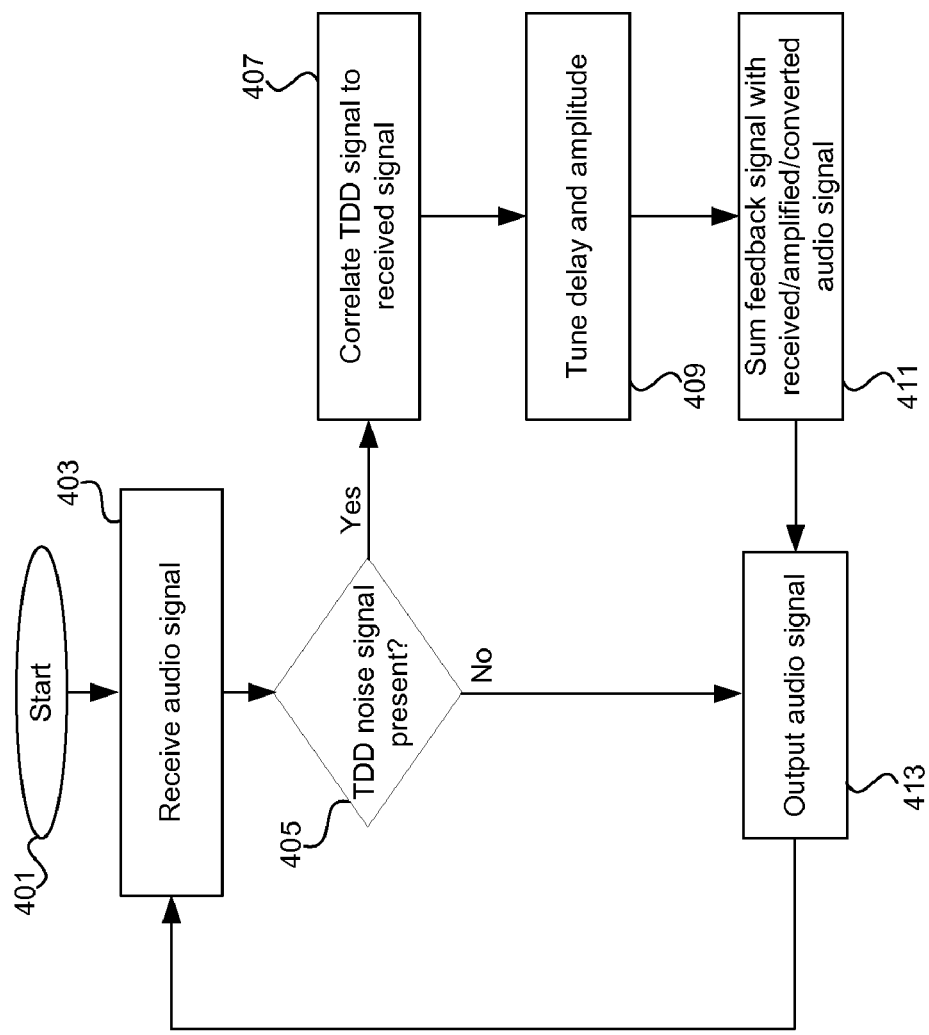
FIG. 4 is a flow diagram illustrating an exemplary time division duplex hum noise cancellation process, in accordance with an embodiment of the invention.

FIG. 4 is a flow diagram illustrating an exemplary time division duplex hum noise cancellation process, in accordance with an embodiment of the invention. Referring to FIG. 4, in step 403, following start step 401, the audio signal may be received. In step 405, in instances where a TDD noise signal may not be present, the process may proceed to step 413 where the audio signal may be output. In step 405, in instances where a TDD noise signal may be present, the process may proceed to step 407 where the received TDD signal may be correlated with the received audio signal. In step 409, the correlation may be used to tune the delay and amplitude of the feedback signal before step 411 where it may be summed with the received/amplified/converted audio signal to cancel the TDD hum noise. The process may then proceed to step 403 to repeat the loop.

In an embodiment of the invention, a method and system are provided for TDD hum noise cancellation and may comprise correlating a received audio signal to a time division duplexed (TDD) envelope signal 321, controlling a feedback signal based on the correlating, and cancelling a TDD noise signal 211 via the feedback signal. The amplitude 315 and delay 313 of the feedback signal may be configured for the controlling. A least mean square (LMS) filter may be utilized for the correlating and may comprise a finite impulse response filter. The TDD envelope signal may be generated on the chip 205 or may be received from a source external to the chip 205. The feedback signal may be added to the received audio signal for the cancelling.

Certain embodiments of the invention may comprise a machine-readable storage having stored thereon, a computer program having at least one code section for TDD hum noise cancellation, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals, the method comprising:
   in a chip, correlating a received audio signal to a time division duplex (TDD) envelope signal;
   controlling a feedback signal based on said correlating; and
   cancelling an audio-frequency TDD noise signal via said feedback signal.

2. The method according to claim 1, comprising configuring an amplitude of said feedback signal for said controlling.

3. The method according to claim 1, comprising configuring a delay of said feedback signal for said controlling.

4. The method according to claim 1, comprising correlating said received audio signal to said time division duplex (TDD) envelope signal via a least mean square (LMS) filter.

5. The method according to claim 4, wherein said LMS filter comprises a finite impulse response filter.

6. The method according to claim 1, comprising generating said TDD envelope signal within said chip.

7. The method according to claim 1, comprising receiving said TDD envelope signal from a source external to said chip.

8. The method according to claim 1, comprising adding said feedback signal to said received audio signal for said cancelling.

9. A system for processing signals, the system comprising:
   one or more circuits within a chip, wherein said one or more circuits correlate a received audio signal to a time division duplex (TDD) envelope signal;
   said one or more circuits controls a feedback signal based on said correlating; and
   said one or more circuits cancels an audio-frequency TDD noise signal via said feedback signal.

10. The system according to claim 9, wherein said one or more circuits configures an amplitude of said feedback signal for said controlling.

11. The system according to claim 9, wherein said one or more circuits configures a delay of said feedback signal for said configuring.

12. The system according to claim 9, wherein said one or more circuits comprises a least mean square (LMS) filter that enables said correlating.

13. The system according to claim 12, wherein said LMS filter comprises a finite impulse response filter.

14. The system according to claim 9, wherein said one or more circuits generates said TDD envelope signal within said chip.

15. The system according to claim 9, wherein said one or more circuits receives said TDD envelope signal from a source external to said chip.

16. The system according to claim 9, wherein said one or more circuits adds said feedback signal to said received audio signal for said cancelling.

17. A non-transitory machine-readable storage having stored thereon, a computer program having at least one code section for processing signals, the at least one code section being executable by a machine for causing the machine to perform steps comprising:
   in a chip, correlating a received audio signal to a time division duplex (TDD) envelope signal;
   controlling a feedback signal based on said correlating; and
   cancelling an audio-frequency TDD noise signal via said feedback signal.

18. The machine readable storage according to claim 17, wherein said at least one code section comprises code for configuring an amplitude of said feedback signal for said controlling.

19. The machine readable storage according to claim 17, wherein said at least one code section comprises code for configuring a delay of said feedback signal for said controlling.

20. The machine readable storage according to claim 17, wherein said at least one code section comprises code for correlating said received audio signal to said time division duplexed (TDD) envelope signal via a least mean square (LMS) filter.

21. The machine readable storage according to claim 20, wherein said LMS filter comprises a finite impulse response filter.

22. The machine readable storage according to claim 17, wherein said at least one code section comprises code for generating said TDD envelope signal within said chip.

23. The machine readable storage according to claim 17, wherein said at least one code section comprises code for receiving said TDD envelope signal from a source external to said chip.

24. The machine readable storage according to claim 17, wherein said at least one code section comprises code for adding said feedback signal to said received audio signal for said cancelling.

* * * * *